United States Patent
Biskner

(10) Patent No.: US 8,717,910 B2
(45) Date of Patent: May 6, 2014

(54) FIELD MODULATION FOR TRANSFER AND MEASUREMENT OF FLOW STATISTICS

(75) Inventor: Robert Biskner, Santa Barbara, CA (US)

(73) Assignee: Cisco Technology, Inc., San Jose, CA (US)

( * ) Notice: Subject to any disclaimer, the term of this patent is extended or adjusted under 35 U.S.C. 154(b) by 411 days.

(21) Appl. No.: 11/740,784

(22) Filed: Apr. 26, 2007

(65) Prior Publication Data

US 2008/0267185 A1 Oct. 30, 2008

(51) Int. Cl.
*H04L 12/26* (2006.01)

(52) U.S. Cl.
CPC ..................................... *H04L 43/00* (2013.01)
USPC .......................................... 370/252; 370/389

(58) Field of Classification Search
USPC ................... 709/231, 328; 370/389; 710/105
See application file for complete search history.

(56) References Cited

U.S. PATENT DOCUMENTS

| | | | | |
|---|---|---|---|---|
| 4,941,089 | A * | 7/1990 | Fischer | 709/231 |
| 5,790,607 | A * | 8/1998 | Burke et al. | 375/355 |
| 7,321,565 | B2 * | 1/2008 | Todd et al. | 370/253 |
| 2002/0002636 | A1 * | 1/2002 | Vange et al. | 709/328 |
| 2002/0141392 | A1 * | 10/2002 | Tezuka et al. | 370/352 |
| 2005/0044208 | A1 * | 2/2005 | Jones et al. | 709/224 |
| 2005/0058129 | A1 * | 3/2005 | Jones et al. | 370/389 |
| 2007/0180172 | A1 * | 8/2007 | Schmidt et al. | 710/105 |

OTHER PUBLICATIONS

Jones, E.; Le Moigne, O.; Robert, J.-M., "IP traceback solutions based on time to live covert channel," Networks, 2004. (ICON 2004). Proceedings. 12th IEEE International Conference on , vol. 2, no., pp. 451,457 vol. 2, Nov. 16-19, 2004.*

Zander, S.; Armitage, G.; Branch, P., "Covert Channels in the IP Time to Live Field," Australian Telecommunications & Applications Conference (ATNAC), Australia, Dec. 2006.*

Zander, S.; Armitage, G.; Branch, P., "An Empirical Evaluation of IP Time to Live Covert Channels," Networks, 2007. ICON 2007. 15th IEEE International Conference on , vol., no., pp. 42,47, Nov. 19-21, 2007.*

Schulzrinne et al., "RTP: A Transport Protocol for Real-Time Applications", RFC 3550, Jul. 2003.

U.S. Application Entitled "Low Deviation Field Modulation for Transfer of Information", U.S. Appl. No. 11/677,995, filed Feb. 22, 2007.

Zander, Sebastian, et al., "Covert Channels and Countermeasures in Computer Network Protocols," IEEE Communications Magazine, Dec. 2007, pp. 136-142.

Zander, Sebastian, et al., "A Survey of Covert Channels and Countermeasures in Computer Network Protocols," IEEE Communications Survey & Tutorials, 3rd Quarter 2007, pp. 44-57.

* cited by examiner

*Primary Examiner* — Joseph Bednash

(74) *Attorney, Agent, or Firm* — Novak Druce Connolly Bove + Quigg LLP

(57) ABSTRACT

A first network device determines flow statistics information associated with a flow. The first network device modulates the time-to-live (TTL) header field in a packet associated with the flow to include flow statistics information. The packet includes a header and a payload. The first network device transmits the packet to a second network device. The second network device demodulates the TTL header field to determine flow statistics information.

27 Claims, 7 Drawing Sheets

# FIELD MODULATION FOR TRANSFER AND MEASUREMENT OF FLOW STATISTICS

TECHNICAL FIELD

The present disclosure relates to field modulation for transfer and measurement of flow statistics in a network.

DESCRIPTION OF RELATED ART

A variety of network devices along the flow pathway measure flow statistics information. The network devices often exchange measured flow characteristics either in-band within the flow itself or out-of-band in a separate flow constructed explicitly for the purpose of statistics and measurement exchange. Out-of-band exchanges may potentially experience flow characteristics different from the flow that they are intended to measure and have the added administrative inconveniences. In-band exchanges beneficially follow the pathway of measured flow.

However, mechanisms for providing in-band flow statistics information are limited. Consequently, it is desirable to provide improved methods and apparatus for transfer and measurement of flow statistics in a network.

BRIEF DESCRIPTION OF THE DRAWINGS

The disclosure may best be understood by reference to the following description taken in conjunction with the accompanying drawings, which illustrate particular example embodiments.

DESCRIPTION OF EXAMPLE EMBODIMENTS

Figure 1:
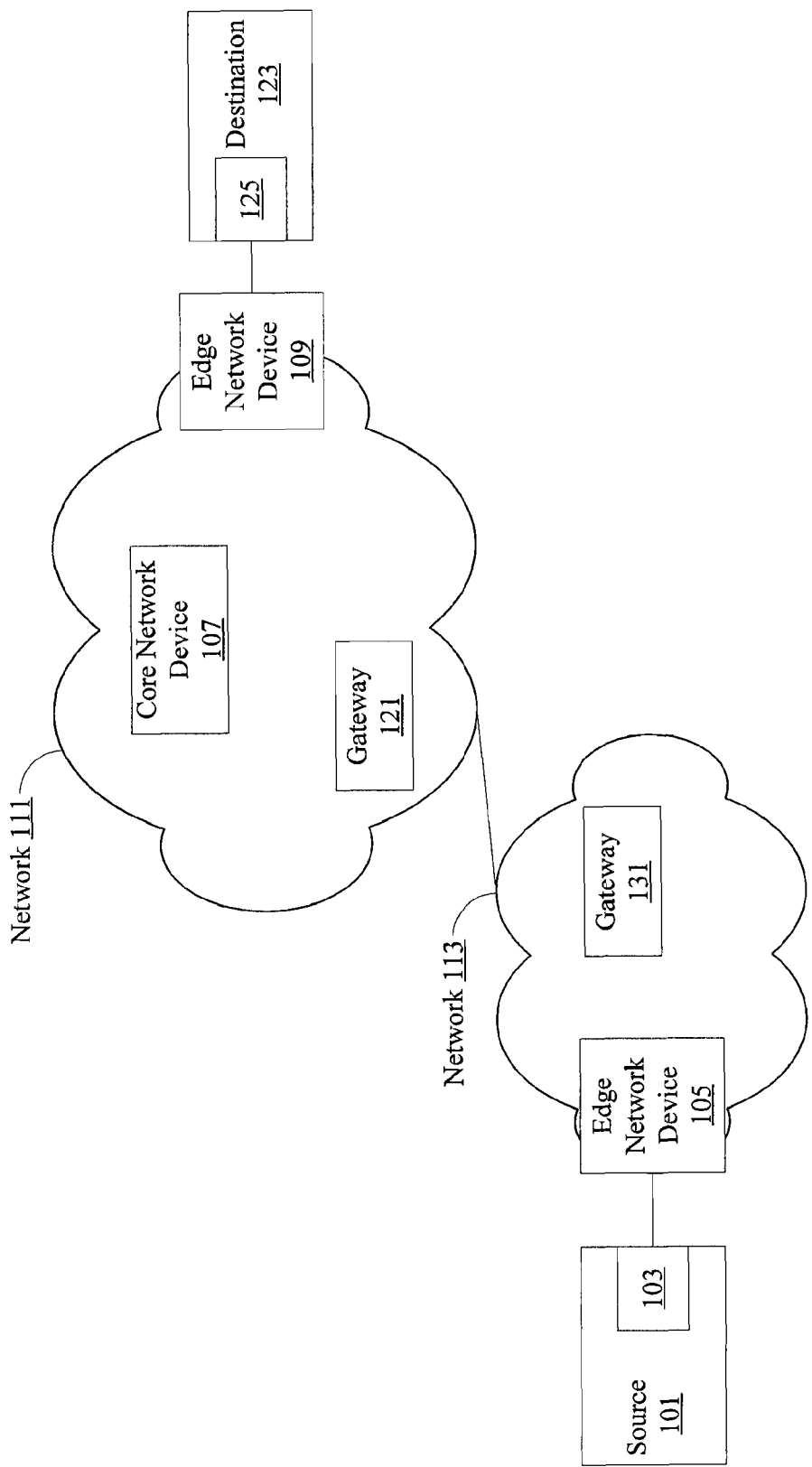
FIG. 1 illustrates a particular example of a network.

Reference will now be made in detail to some specific examples of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims.

For example, the techniques of the present invention will be described in the context of particular packet, packet header fields, and networks. However, it should be noted that the techniques of the present invention apply to a variety of packets, packet header fields, and a variety of different networks. In the following description, numerous specific details are set forth in order to provide a thorough understanding of the present invention. Particular example embodiments of the present invention may be implemented without some or all of these specific details. In other instances, well known process operations have not been described in detail in order not to unnecessarily obscure the present invention.

Various techniques and mechanisms of the present invention will sometimes be described in singular form for clarity. However, it should be noted that some embodiments include multiple iterations of a technique or multiple instantiations of a mechanism unless noted otherwise. For example, a system uses a processor in a variety of contexts. However, it will be appreciated that a system can use multiple processors can while remaining within the scope of the present invention unless otherwise noted. Furthermore, the techniques and mechanisms of the present invention will sometimes describe a connection between two entities. It should be noted that a connection between two entities does not necessarily mean a direct, unimpeded connection, as a variety of other entities may reside between the two entities. For example, a processor may be connected to memory, but it will be appreciated that a variety of bridges and controllers may reside between the processor and memory. Consequently, a connection does not necessarily mean a direct, unimpeded connection unless otherwise noted.

Overview

A first network device may determine flow statistics information associated with a flow. The first network device may modulate the time-to-live (TTL) header field in a packet associated with the flow to include flow statistics information. The packet includes a header and a payload. The first network device may transmit the packet to a second network device. The second network device may demodulate the TTL header field to determine flow statistics information.

EXAMPLE EMBODIMENTS

According to particular example embodiments, a network device determines flow statistics information such as delay, latency, and jitter for a flow and modifies a quasi-static header field in a packet associated with the flow to transfer the flow statistics information to another network device. In one particular embodiment, a network device modifies a header field such as a Time-To-Live (TTL) field by a value ranging between 0 and 127 to carry flow statistics information. The header field can carry flows statistics information in a header field unrelated to flow statistics.

Network devices typically use a TTL field to prevent packets from lingering in a network ad infinitum. In one particular example, a source typically sets the TTL field in a packet to a particular value such as 64 and each network device along a path to the destination decrements the TTL. If the TTL reaches 0, a network device drops the packet. Various particular embodiments recognize that a header field such as a TTL field can be modified without adversely affecting the function of a TTL. Although a TTL field may be, e.g., 8 bits long, allowing for a TTL value of 255, it is recognized that the TTL value rarely needs to exceed 100. In particular embodiments, the available TTL field is set to a maximum of about 100, allowing for up to 155 unused TTL values for holding flow statistics information.

The modulated field values can hold a variety of different types of information. According to particular embodiments, the modulated field values hold intra-network metrics such as stream ID, edge entry ID, type, traffic class, number of hops, ingress TTL value, reroute count, round trip time, inter-arrival jitter, packets per second, inter-arrival gap per packet pair, inter-send gap per packet pair, number of lost packets, loss ratio, retransmissions, out-of-order packets, long term and short term minimum and maximum transmission rates, etc. The modulated field values can also hold inter-network metrics such as stream identifier, traffic class, number of hops, reroute count, round trip time, inter-arrival jitter, packets per second, short and long term inter-arrival gap, short and long term inter-send gap, lost packets, loss ratio, retransmission, out-of-order packets, and an estimate of modulation quality.

According to particular embodiments, modulation entails modifying a base header field value. In the case of TTL field, a base TTL value is chosen by a sender. Modulations to the base value in amount to additions to the base value. In other particular embodiments, a base TTL value of 120 would allow a dynamic range of addition modulation between 0 and 127 or 7-bits of modulation in an 8-bit TTL field. A base TTL value of 200 would allow for a lower modulation.

By modulating an existing header field in order to transfer information, and by avoiding the insertion of new fields in a header, particular embodiments allow in-band information exchange without the penalty of new flows, new fields, and out-of-band uncertainty.

According to particular embodiments, modulation is self synchronizing at a receiver, and does not require coordinated configuration between a sender and a receiver. In particular examples, a preamble is used for synchronization. The modulation can be tuned to allow transfer of a large amount of information in a single header field.

According to particular embodiments, the modulated stream may also include commands for intermediate and or endpoint network devices. Some example commands includes instructions for an intermediate device to capture flow statistics information and insert the information into the modulated stream. This can be particularly useful when entering and exiting a specific administrative domain.

A series of sequential packets form a modulated stream. The modulated stream includes a preamble section and a payload section. The preamble section allows the receiver to synchronize with the sender. In some examples, a preamble is constructed to allow a receiver to resynchronize on every TTL modulate frame received in order to discover and recover from topology changes which affect the TTL field. When using TTL modulation, the receiver can detect the number of HOPS between the sender and the receiver and the BASE TTL value used by the sender. The payload section allows the sender to send any information desired. In the TTL modulation example the sender passes information to compute round-trip time, loss, and jitter. The modulated stream can also include Golay or Barker codes, error correction, error detection (CRC) or encryption.

At certain points in time, a network topology may change and the resulting TTL for a stream from a source to a destination may change. However, various particular embodiments recognize that a destination device can detect network topology changes by recognizing average TTL changes. If the modulated stream included in a packet stream has an average TTL value of 100, a destination device can still extract the modulated stream by recognizing variations from the stepped up or stepped down TTL.

Although particular embodiments are being described in the context of TTL for clarity purposes, it should be recognized that a variety of packet header fields in a variety of different packet formats can be used. In particular example embodiments, Real-time Transport Protocol packets include contributing source fields that could be used to include a modulated stream. According to particular example embodiments, some header fields such as the TTL field are particularly suited for carrying a modulated stream encoded using values.

FIG. 1 illustrates a particular example of a network that can use particular example embodiments. A destination 123 is connected to an edge network device 109 through interface 125. According to particular example embodiments, the destination 123 is a client, mobile device, server, terminal, endpoint or network device. The edge network device 109 is included in network 111. In particular example embodiments, network 111 is a cell and/or packet based service provider network including multiple subnetworks supporting one or more protocols such as the Internet Protocol (IP) and the Real-Time Transport Protocol (RTP). Packets transmitted in service provider network 111 may have headers such as IP, User Datagram Protocol (UDP), Transmission Control Protocol (TCP), Stream Control Transmission Protocol (SCTP), or other cell/packet headers. Service provider network 111 also includes core network device 107, and gateway 121. The service provider network 111 is connected to network 113.

In particular example embodiments, network 113 is a cell and/or packet based enterprise network including multiple subnetworks supporting one or more protocols such as the Internet Protocol (IP) and the Real-Time Transport Protocol (RTP). Packets transmitted in the enterprise network 113 may have headers such as IP, User Datagram Protocol (UDP), Transmission Control Protocol (TCP), Stream Control Transmission Protocol (SCTP), or other cell/packet headers. Enterprise network 111 also includes core network device edge network device 105 and gateway 131. Source 101 is connected to edge network device 105 through interface 103.

According to particular example embodiments, any device that has access to flow metrics can perform packet header modulation to transfer information such as loss, delay, and jitter. In some embodiments, a source 101 or a source interface 103 is a network device that modulates packet header information by performing modifications to allow the transfer of information to a destination 123. In other examples, an edge network device 105 performs packet header modulation on packets in a particular stream. In still other examples, a core network device 107 or a gateway 121 performs packet modulation to insert a modulated stream into a packet stream. In particular embodiments, a destination 123 extracts the modulated stream from the packet stream. In other examples, a network device such as an edge network device 109 extracts and decodes the modulated stream. In particular examples, the modulated stream is a sequence of values added to a stream of TTL header values. In particular examples, the TTL field allows for values between 0 and 255. If the base TTL value is set to 100, any values between 1 and 155 can be added to the base TTL value. In a network where paths are relatively stable or path lengths are relative stable, the modulated stream of values can be extracted to ascertain flow statistics information such as loss, latency, and jitter information.

Figure 2:
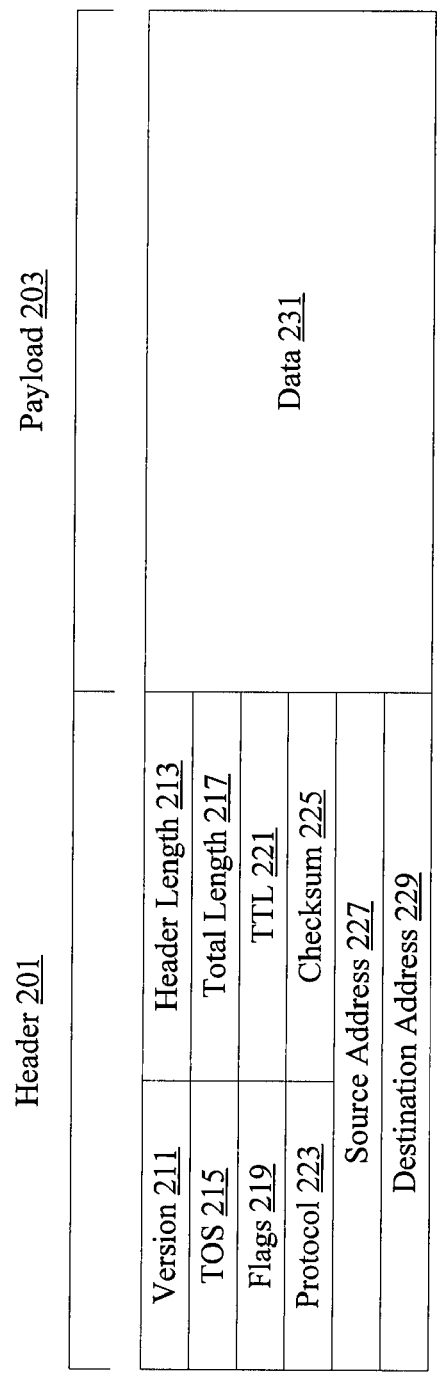
FIG. 2 illustrates a particular example of a packet.

FIG. 2 illustrates a particular example of a packet that has headers that can carry a modulated stream. According to particular example embodiments, the packet includes header 201 and payload 203. A system may also use other fields to hold modulated stream information. Header 201 includes version 211. In particular example embodiments, the version 211 specifies the format of a header such as an IP header. The header length 213 specifies the length of the IP packet header in 32 bit words. Type of Service (TOS) 215 specifies the parameters for the type of service requested. Networks can use the parameters to configure handling of the datagram during transport. Total length 217 specifies the total length of the packet in 32 bit words. In particular example embodiments, flags 219 indicate if the packet can be fragmented. Source address 227 specifies a source device address and destination address 229 specifies a destination device address.

In particular example embodiments, protocol 223 specifies an encapsulated protocol. Checksum 225 provides error correction/detection for the packet header 201 and/or the data 231 in packet payload 203. TTL 221 is a counter timer field used to track the lifetime of the packet. When the TTL field is decremented to zero, the datagram is typically discarded.

According to particular example embodiments, the TTL field 221 is particularly suitable for carrying a modulated stream because slight alterations to the field do not adversely impact network operation and the TTL 221 is typically transmitted in clear text. On the other hand, slight modifications to other fields such as a version 211 may significantly impact network operation. For example, changing a version 211 to a version unsupported by a particular device may lead to packet drops. Slight modifications to the TTL 221, however, usually have no impact on packet transmission and in the worst case may cause a packet to be dropped slightly early or late. However, TTL 221 is usually set somewhat arbitrarily anyway by a source application, so variations do not have much impact. Even though the TTL 221 field is particularly suited for carrying a modulated stream, other header fields and optional fields can be used as well. Some RTP fields are also particularly suited for carrying modulated streams.

Figure 3:
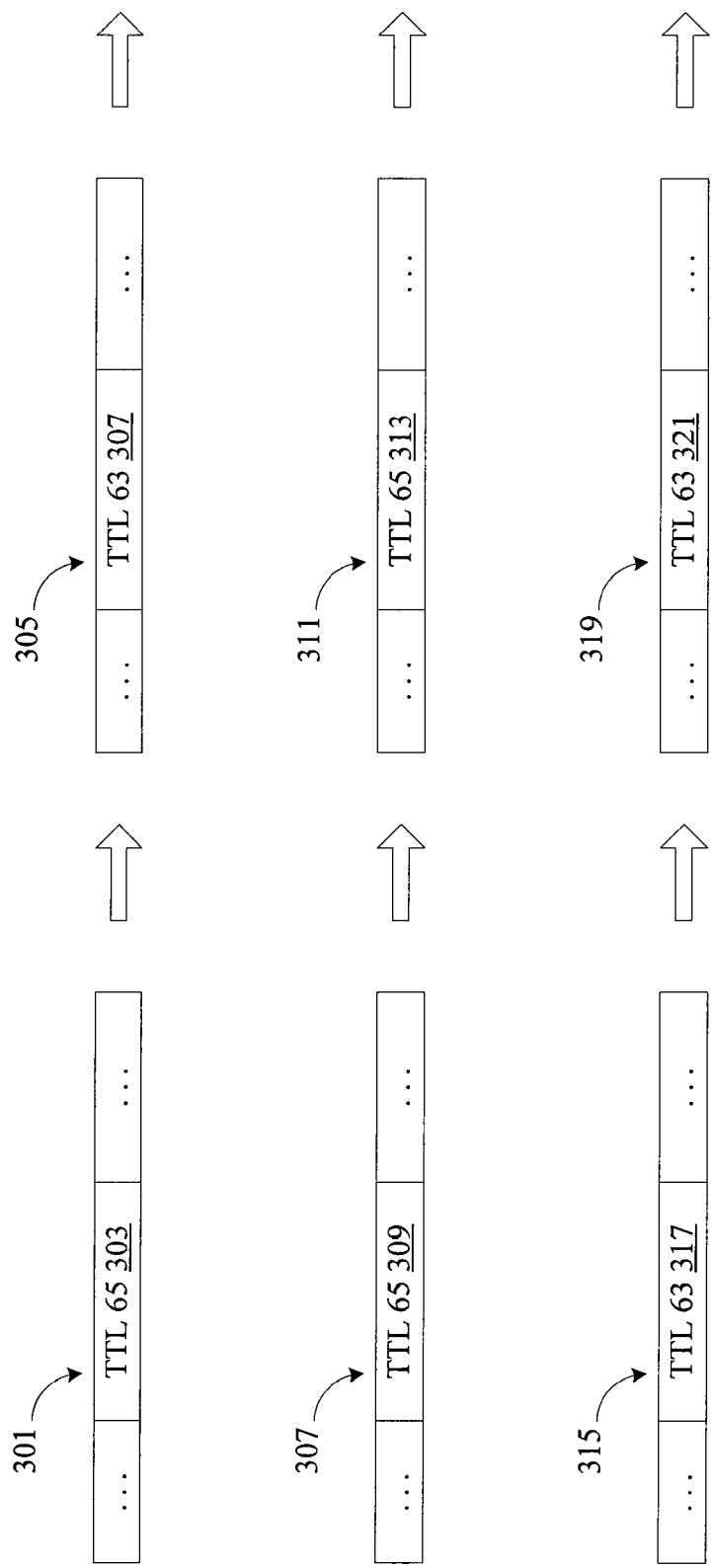
FIG. 3 illustrates a particular example of a packet stream having modified headers.

FIG. 3 illustrates one example of a packet stream. According to particular example embodiments, the packet stream includes packets 301, 305, 307, 311, 315, and 319. A source application sets the TTL for the packets to 64. In particular example embodiments, packets will be dropped after traveling 64 hops. This prevents packets from perpetually lingering in a network. Setting a TTL too high allows many packets to linger while setting a TTL too low leads to premature drops. According to particular example embodiments, a modulated stream is included in a packet stream by modifying TTL values slightly. In particular embodiments, a stream 100, 63, 24, 89, 121, and 5 is included in a packet stream by modifying the TTL values to 164, 127, 88, 153, 185, and 69.

In many networks, path lengths are relatively stable, or at least stable for set periods of time. In particular embodiments, the path length is 20 from a source to a destination. The TTL values at the destination would be 144, 107, 68, 133, 165, and 49. Since the path is generally stable, a destination device receiving the TTL values would be able to extract the modulated stream 100, 63, 24, 89, 121, and 5 using the base value of 64. A variety of techniques including spread spectrum techniques can generate a modulated stream.

In particular example embodiments, a code or key may be known in advance by a source and a destination. The modulated stream appears as random and as "noise-like" as possible, but still be reproducible. Consequently, the sequence is nearly random. In some examples, a feedback shift register is used to generate pseudo-random codes. In other examples, the modulated stream is an encrypted stream that could not be accessed even if detected by an outside party. Key exchange could be performed using the modulated stream or some other mechanism. In some instances, key exchange is performed using normal packets with data transfer included in the payloads but verification information may be carried in a modulated stream in header fields.

Figure 4:
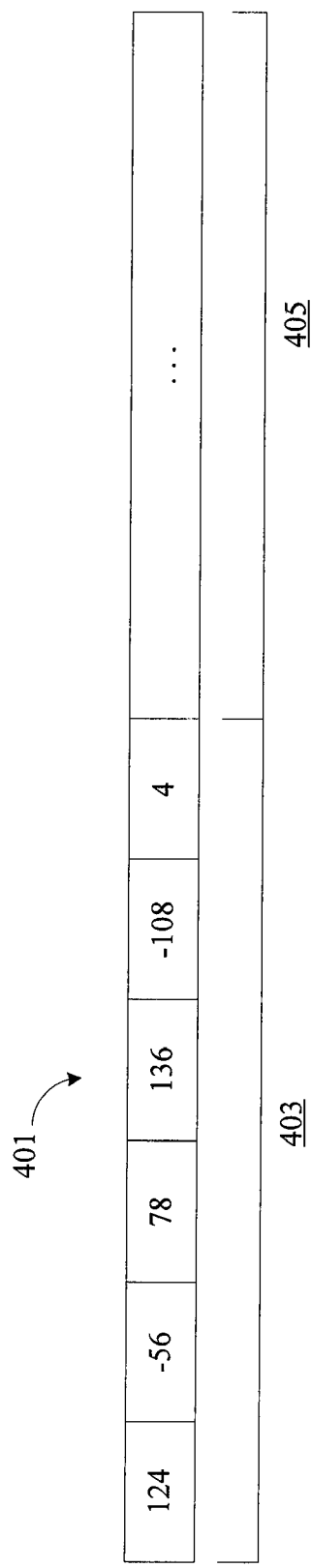
FIG. 4 illustrates a particular example of modulated stream.

FIG. 4 illustrates one example of a modulated stream. According to particular example embodiments, a modulated stream 401 includes synchronization bits 403 as well as data bits 405. In particular example embodiments, synchronization bits such as Barker codes are used to identify the start of a data sequence to a destination. Synchronization bits such as Barker codes are typically selected for their autocorrelation properties. Autocorrelation is typically a measure of how well a signal matches a time-shifted version of itself. Synchronization bits are typically selected for low autocorrelation.

One 18-bit Barker code sequence is +1, +1, +1, +1, +1, −1, −1, +1, +1, −1, +1, −1, +1. Some other examples of Barker codes are +1, −1 and +1, +1 for two bit sequences, +1, +1, −1 for three bit sequences, and +1, −1, +1, +1 and +1, −1, −1, −1, for four bit sequences. Some longer examples of Barker codes sequences include +1, +1, +1, −1, +1 for five bit sequences, +1, +1, +1, −1, −1, +1, −1 for seven bit sequences, +1, +1, +1, −1, −1, −1, +1, −1, −1, +1, −1 for eleven bit sequences, and +1, +1, +1, +1, +1, −1, −1, +1, +1, −1, +1, −1, +1 for thirteen bit sequences. Autocorrelation is also useful for finding repeating patterns in a signal so that a destination can possibly detect a modulated stream even if there is no prior notification. According to various embodiments, a Barker code can be included in a few packets, or bits of a Barker code can be spread out over many packets. In some examples, 18 consecutive packets hold the 18 consecutive bits of an 18-bit Barker code sequence, while other bits in the packets are used to hold other flow statistics information. In other particular examples, a single packet or a few packets hold an entire Barker code.

According to particular example embodiments, a modulated stream includes error correction codes and error checking codes. In particular example embodiments, error correction codes and error checking codes allow a destination to decode a modulated stream despite packet drops.

Using large values allows modified header fields to potentially carry more information. For example, each header field can include an 8-bit value. Although modifying a header field by a large value is more likely to adversely impact system operation, even large variations to a TTL value are relatively harmless and are effective in conveying large amounts of information.

Figure 5:
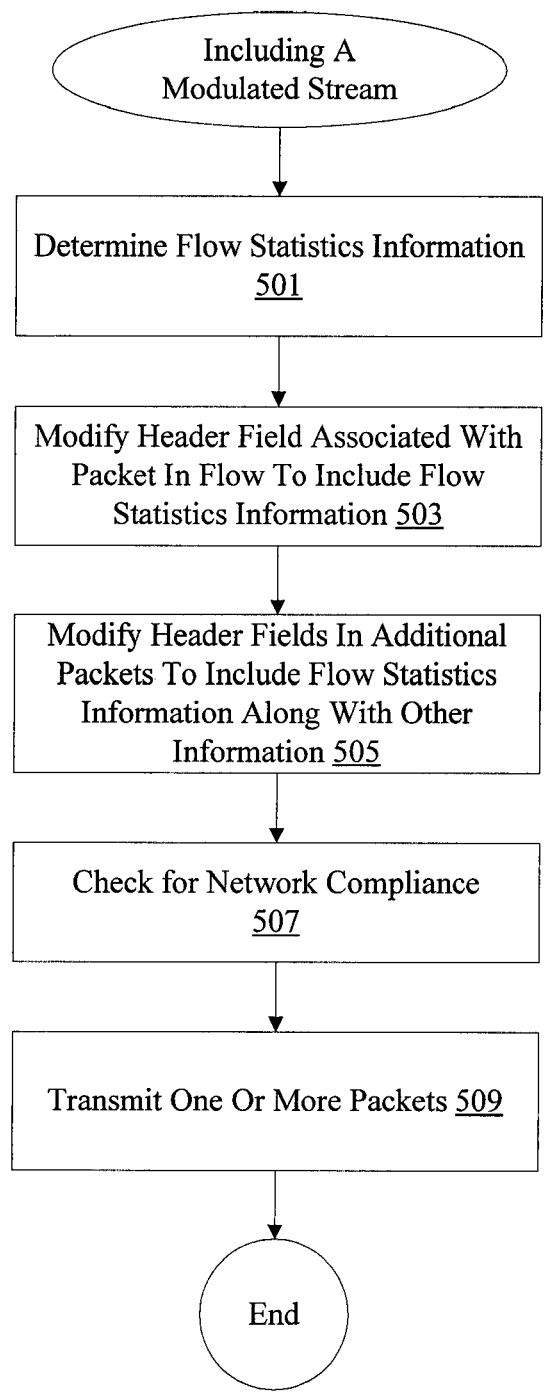
FIG. 5 illustrates a particular example of a technique for including modulated header field.

FIG. 5 illustrates a technique for transmitting a packet stream including a modulated stream. At 501, a network device determines flow statistics information. According to particular embodiments, flow statistics information includes latency, delay, and jitter information. In particular examples, flow statistics information may include intra-network metrics such as stream ID, edge entry ID, type, traffic class, number of hops, ingress TTL value, reroute count, round trip time, inter-arrival jitter, packets per second, inter-arrival gap per packet pair, inter-send gap per packet pair, number of lost packets, loss ratio, retransmissions, out-of-order packets, long term and short term minimum and maximum transmission rates, etc. Flow statistics information may also include inter-network metrics such as stream identifier, traffic class, number of hops, reroute count, round trip time, inter-arrival jitter, packets per second, short and long term inter-arrival gap, short and long term inter-send gap, lost packets, loss ratio, retransmission, out-of-order packets, and an estimate of modulation quality.

At 503, a header field associated with the packet in the flow is modified to include flow statistics information. According to particular embodiments, packet headers for a number of packets have to be modified at 505 to include flow statistics information as well as error correction codes, synchronization codes, etc. In particular examples, a series of packets have TTL headers that are modified to include a modulated stream of information, with each TTL header field holding 6 bits of modulated stream information.

According to particular embodiments, a network device modifies header fields using flow statistics information. According to particular example embodiments, the network device modifies the TTL using values provided by the modulated stream. If the intended TTL for transmitted packets is 64, the modified TTL header values transmitted would be between 64 and 255, where 255 is the max TTL value accepted by a network. At 507, the system performs a check for network compliance. According to particular example embodiments, the check determines if the packet including modified packet headers is in compliance with a particular protocol. In particular example embodiments, a system performs a check to verify that the TTL does not exceed a max network supported TTL. At 509, the network device transmits the packet that may be associated with a packet stream. According to particular example embodiments, the packet stream is transmitted with a modulated stream embedded in header fields.

Figure 6:
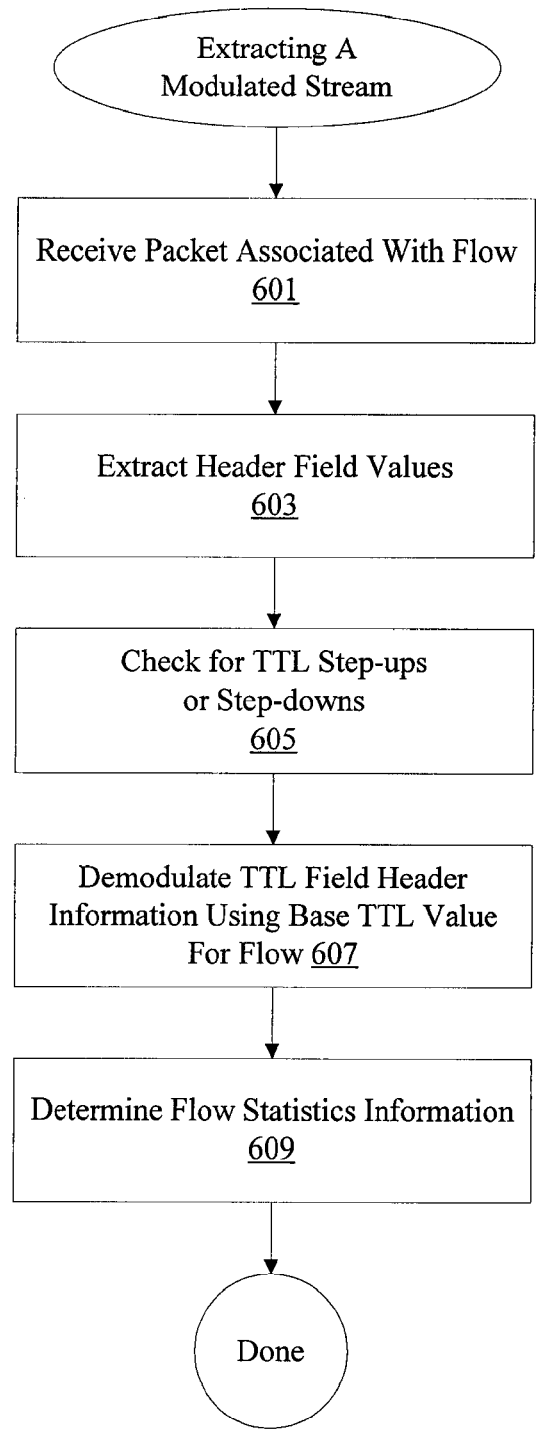
FIG. 6 illustrates a particular example of a technique for extracting a modulated header field.

FIG. 6 illustrates a technique for receiving a packet stream and a modulated stream. At 601, a network device receives a packet. According to particular example embodiments, the packet is associated with a flow corresponding to source destination pairs. The destination device receiving the packet may know that a source device has sent a packet stream having a modulated stream. In particular examples, the destination device checks for Barker codes or other synchronization codes to determine if a modulated stream is present in the packet stream. At 603, the device extracts header field values. In some examples, a network device extracts a variety of header field values. According to particular example embodiments, the network device extracts TTL values. In some example embodiments, more than one header field in a packet is used to hold modulated stream information.

At 605, assuming the TTL values are extracted, a system checks for TTL step-ups and step-downs. That is, the system checks for periods when network topology changes and a path length changes upwardly or downwardly. It is recognized that received TTL values change most frequently when network topology changes. These periodic events lead to a stable shift in path lengths and consequently received TTL values. In some instances, the path lengths may change dramatically.

For example, a source may periodically send using a base TTL value and indicate either using a prior packet or some other synchronization mechanism that the base TTL value is being used. In some examples, the base TTL value is 100 and the number of hops is 20. The expected TTL value is 80 at the destination. However, if the received TTL value is 75, then the destination knows that the path may have changed. The number of hops is now 25. A step change of 5 would be applied to the TTL modulated stream.

In particular example embodiments, a system only considers the variation from a local mean. It is recognized that after a network topology change, path lengths stabilize. At 607, TTL field header information using the base TTL value for the flow is determined. In some examples, the field header may provide latency information or a portion of latency information. The field header may be part of an encrypted stream providing flow statistics information. At 609, flow statistics information is determined, possibly by using a decryption mechanism.

Figure 7:
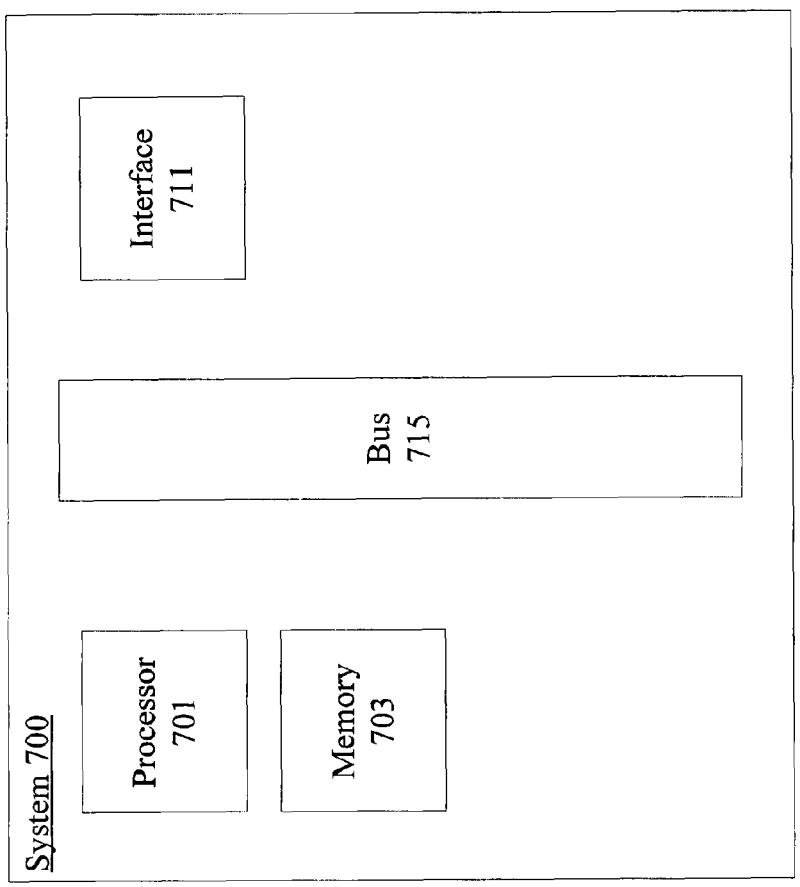
FIG. 7 illustrates a particular example of a network device.

A variety of devices and applications can use particular examples of modulated streams. Server, routers, switches, line cards, can all use modulated streams. FIG. 7 illustrates one example of a device that can use a modulated stream.

According to particular example embodiments, a system 700 suitable for implementing particular embodiments of the present invention includes a processor 701, a memory 703, an interface 711, and a bus 715 (e.g., a PCI bus). When acting under the control of appropriate software or firmware, the processor 701 is responsible for such tasks such as encoding and decoding modulated streams. Various specially configured devices can also be used in place of a processor 701 or in addition to processor 701. The interface 711 is typically configured to send and/or receive data packets or data segments over a network. Particular examples of interfaces supports include Ethernet interfaces, frame relay interfaces, cable interfaces, DSL interfaces, token ring interfaces, and the like. In addition, various very high-speed interfaces may be provided such as fast Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management.

According to particular example embodiments, the system 700 uses memory 703 to store data and program instructions. The program instructions may control the operation of an operating system and/or one or more applications, for example. The memory or memories may also be configured to store received packets, bindings, Keep-Alive states, periodicity information for monitored session packets, Flow-Through and/or Flow-Around configurations, etc.

Because such information and program instructions may be employed to implement the systems/methods described herein, the present invention relates to tangible, machine readable media that include program instructions, state information, etc. for performing various operations described herein. Examples of machine-readable media include, but are not limited to, magnetic media such as hard disks, floppy disks, and magnetic tape; optical media such as CD-ROM disks and DVDs; magneto-optical media such as optical disks; and hardware devices that are specially configured to store and perform program instructions, such as read-only memory devices (ROM) and random access memory (RAM). Examples of program instructions include both machine code, such as produced by a compiler, and files containing higher level code that may be executed by the computer using an interpreter.

Although the foregoing invention has been described in some detail for purposes of clarity of understanding, it will be apparent that certain changes and modifications may be practiced within the scope of the appended claims. Therefore, the present embodiments are to be considered as illustrative and not restrictive and the invention is not to be limited to the details given herein, but may be modified within the scope and equivalents of the appended claims.

What is claimed is:

1. A method comprising:
   determining flow statistics information at a first network device;
   modulating by the first network device a time-to-live (TTL) header field in a plurality of packets associated with a flow, each of the plurality of packets including a header and a payload, wherein modulating the TTL header field in the plurality of packets comprises modifying the TTL header field in each of the plurality of packets such that the modified TTL header fields in the plurality of packets together carry a bit stream of the flow statistics information including intra-network metrics or inter-network metrics;
   modulating by the first network device a time-to-live (TTL) header field in a second plurality of packets associated with the flow, each of the second plurality of packets including a header and a payload, wherein modulating the TTL header field in the second plurality of packets comprises modifying the TTL header field in each of the second plurality of packets such that the TTL header fields of the second plurality of packets together include an autocorrelation code;
transmitting by the first network device the second plurality of packets to a destination network device from the first network device; and
transmitting by the first network device the plurality of packets to the destination network device, enabling the destination network device to demodulate the TTL header field in the plurality of packets to determine the flow statistics information, wherein the second plurality of packets is transmitted to the destination network device prior to transmitting the plurality of packets to the destination network device.

2. The method of claim 1, wherein the flow statistics information comprises hold delay information.

3. The method of claim 1, wherein the flow statistics information comprises hold jitter information, latency information, or loss information.

4. The method of claim 1, further comprising identifying the flow at the first network device.

5. The method of claim 1, wherein the destination network device demodulates the TTL header field by using a TTL base value that was established by another network device.

6. The method of claim 1, wherein the destination network device is an edge network device, and wherein the first network device is a first core network device.

7. The method of claim 1, wherein the flow statistics information comprises intra-network metrics, wherein the intra-network metrics comprise one or more of the following: reroute count, inter-arrival jitter, packets per second, inter-arrival gap per packet pair, inter-send gap per packet pair, number of lost packets, loss ratio, retransmissions, out-or-order packets, minimum transmission rate, and maximum transmission rate.

8. The method of claim 1, wherein the flow statistics information comprises inter-network metrics, wherein the inter-network metrics comprise one or more of the following: reroute count, inter-arrival jitter, packets per second, inter-arrival gap, inter-send gap, lost packets, loss ratio, retransmission, out-of-order packets, and an estimate of modulation quality.

9. The method of claim 1, wherein the flow statistics information does not include a hop count.

10. The method of claim 1, further comprising:
modulating by the first network device a time-to-live (TTL) header field in a third plurality of packets associated with the flow, wherein modulating the TTL header field in the third plurality of packets comprises modifying the TTL header field in each of the third plurality of packets such that the TTL header fields of the third plurality of packets together include command information.

11. The method of claim 10, wherein the command information directs an intermediate device between the first network device and the destination network device to capture further flow statistics information and modulate the TTL header field of packets associated with the flow to include the captured flow statistics information, wherein the intermediate device is a router or switch.

12. The method of claim 1, further comprising:
modifying the TTL header field in each of a third plurality of packets such that the TTL header fields of the third plurality of packets together include an error correction code or error checking code.

13. The method of claim 1, wherein the destination network device demodulates the TTL header field in the plurality of packets to determine the TTL header field in the plurality of packets by extracting a TTL value from the TTL header field.

14. A system, comprising:
a processor operable to perform operations comprising:
determining flow statistics information at a first network device;
modulating a time-to-live (TTL) header field in a plurality of packets associated with a flow, each of the plurality of packets including a header and a payload, wherein modulating the TTL header field in the plurality of packets comprises modifying a TTL value of the TTL header field in each of the plurality of packets such that modified TTL header fields in the plurality of packets together carry a bit stream of the flow statistics information including a plurality of intra-network metrics or a plurality of inter-network metrics, the bit stream including a plurality of TTL values;
modulating a time-to-live (TTL) header field in a second plurality of packets associated with the flow, each of the second plurality of packets including a header and a payload, wherein modulating the TTL header field in the second plurality of packets comprises modifying the TTL header field in each of the second plurality of packets such that the TTL header fields of the second plurality of packets together include an autocorrelation code; and
an interface communicatively coupled to the processor, the interface operable to perform operations comprising:
transmitting the second plurality of packets to a destination network device from the first network device; and
transmitting the plurality of packets from the first network device to the destination network device, enabling the destination network device to demodulate the TTL header field in the plurality of packets to determine the flow statistics information, and wherein the second plurality of packets is transmitted to the destination network device prior to transmitting the plurality of packets to the destination network device.

15. The system of claim 14, wherein the flow statistics information comprises hold delay information.

16. The system of claim 14, wherein the flow statistics information comprises hold loss information.

17. The system of claim 14, wherein the flow statistics information comprises hold jitter information.

18. The system of claim 14, wherein the processor is further operable to determine a flow.

19. The system of claim 14, wherein the TTL header fields in the second plurality of packets are modulated to include synchronization codes to indicate that a modulated stream is present.

20. The system of claim 14, wherein the destination network device demodulates the TTL header field by using a TTL base value that was established by another network device.

21. The system of claim 14, wherein the flow statistics information comprises a plurality of intra-network metrics, wherein the plurality of intra-network metrics comprise one or more of the following: reroute count, inter-arrival jitter, packets per second, inter-arrival gap per packet pair, inter-send gap per packet pair, number of lost packets, loss ratio, retransmissions, out-of-order packets, minimum transmission rate, and maximum transmission rate.

22. The system of claim 14, wherein the flow statistics information comprises a plurality of inter-network metrics, wherein the plurality of inter-network metrics comprise one or more of the following: reroute count, inter-arrival jitter, packets per second, inter-arrival gap, inter-send gap, lost packets, loss ratio, retransmission, out-of-order packets, and an estimate of modulation quality.

23. The system of claim 14, where each of the plurality of TTL values is a number greater than 100 and less than or equal to 255.

24. An apparatus, comprising:
    means for determining flow statistics information at a first network device;
    means for modulating a time-to-live header field in a plurality of packets associated with a flow, each of the plurality of packets including a header and a payload, wherein modulating the TTL header field in the plurality of packets comprises modifying the TTL header field in each of the plurality of packets such that the modified TTL header fields in the plurality of packets together carry a bit stream of the flow statistics information including intra-network metrics or inter-network metrics;
    means for modulating a time-to-live (TTL) header field in a second plurality of packets associated with the flow, each of the second plurality of packets including a header and a payload, wherein modulating the TTL header field in the second plurality of packets comprises modifying the TTL header field in each of the second plurality of packets such that the TTL header fields of the second plurality of packets together include an autocorrelation code;
    means for transmitting the second plurality of packets to a second network device; and
    means for transmitting the plurality of packets to the second network device, enabling the second network device to demodulate the TTL header field in the plurality of packets by extracting a TTL value from the TTL header field to determine flow statistics information.

25. The apparatus of claim 24, wherein the flow statistics information comprises hold delay information.

26. The apparatus of claim 24, wherein the flow statistics information comprises hold loss information.

27. The apparatus of claim 24, wherein the flow statistics information comprises hold jitter information.

\* \* \* \* \*